Nov. 19, 1963   J. PERRET   3,110,929
APPARATUS FOR MANUFACTURING A WATCH GLASS
Filed Aug. 18, 1961   3 Sheets-Sheet 1

INVENTOR
Jean PERRET
By Jacob L. Kollin,
Attorney

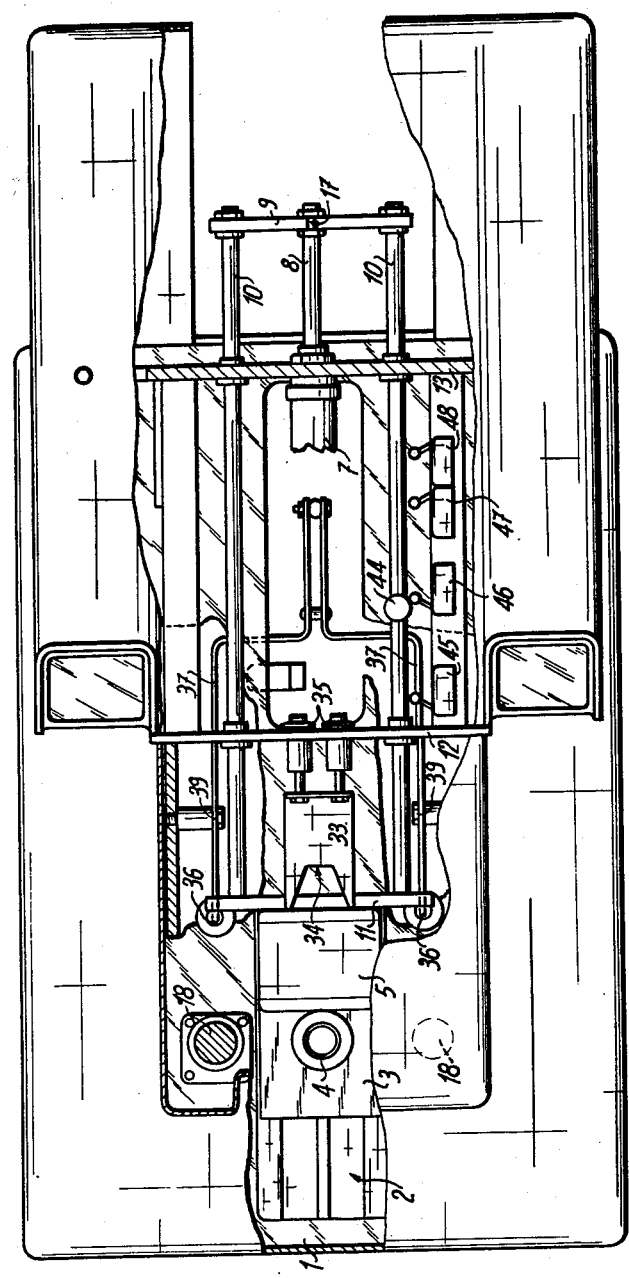

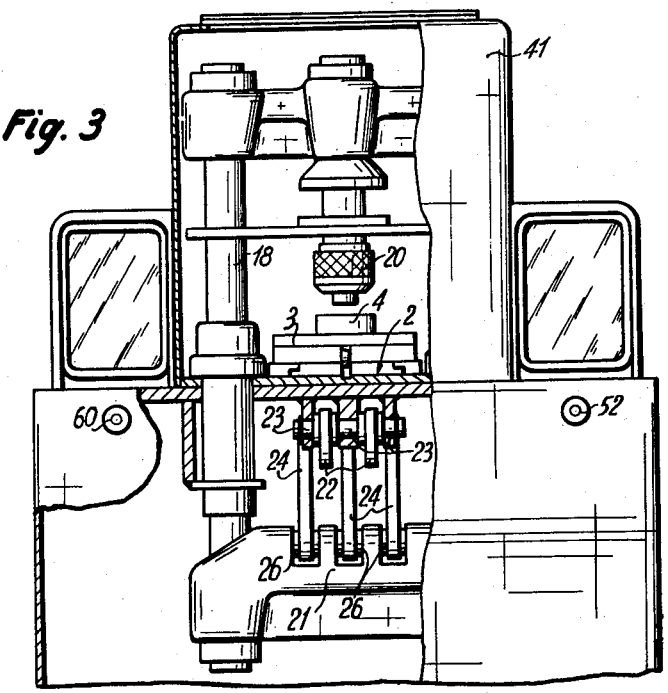
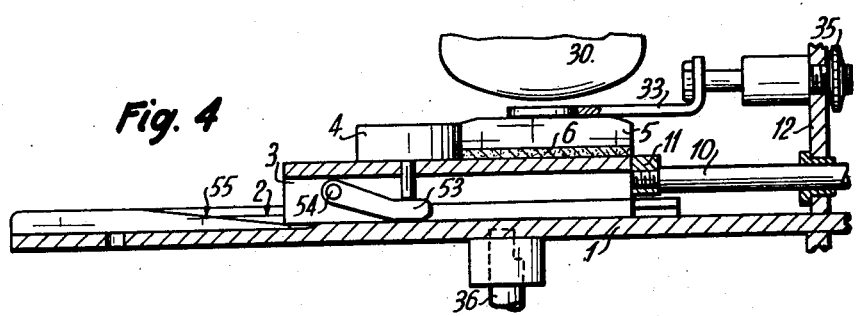
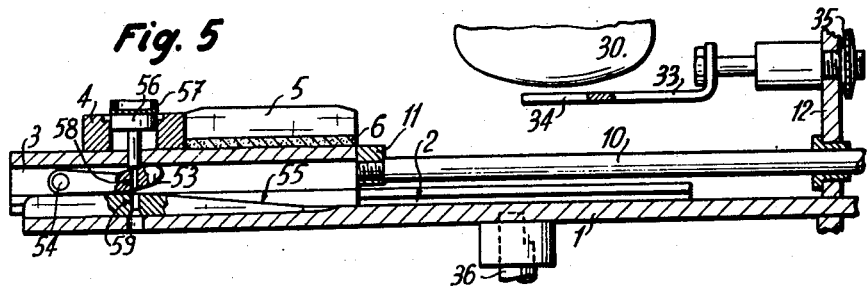

3,110,929
APPARATUS FOR MANUFACTURING A WATCH GLASS
Jean Perret, 28 Confederation, Geneva, Switzerland
Filed Aug. 18, 1961, Ser. No. 132,336
Claims priority, application Switzerland Aug. 23, 1960
4 Claims. (Cl. 18—5)

This invention relates to a machine for manufacturing a component of thermoplastic material, more particularly a watch glass.

In the operation of conventional hot-moulding machines, the blank for the component to be made is a small plate or disc of plastic material which is heated in the mould, the mould together with the material being brought to the softening temperature of the plastic material used. After the moulding operation, the mould is cooled, generally by means of cold air passing through chambers provided for the purpose in the press ram, and then the finished component is removed from the mould. This process results in a considerable loss of time and energy, since the entire mould is heated and then cooled on each operation. The object of the present invention is to obviate these disadvantages.

The operation of the machine of this invention is characterised in that a blank formed by a small plate of plastic material is used, and is heated until soft, is placed in the thus heated state in a mould, and then pressed by means of a punch penetrating into the mould, and then a certain interval of time is allowed to elapse, during which the temperature of the component thus made decreases, thus enabling it to be removed from the mould without its undergoing any deformation.

The machine of this invention is characterised in that it comprises a movable carriage carrying a mould and a heating table situated one after the other with respect to the direction of movement of said carriage, the surface of the heating table being situated level with the top surface of the mould, the machine further comprising a press carrying a punch and a heat source also situated one after the other on the movement axis of said carriage, and a stationary stop situated just above the said heating table, the latter passing beneath said stationary stop during part of the travel of the carriage, the whole being such as to enable the following cycle of operation to be carried out, more particularly with the aid of automatic control means for the press and carriage: the positioning of a blank formed by a small plate of plastic material on the heating table when the carriage is in its most forward position, retraction of the carriage carrying the said blank until the latter occupies a position beneath the heat source, stoppage of the carriage in this position to enable the blank to be heated, retraction of the carriage, the heated and softened blank striking against the said stationary stop and sliding on the table in order finally to drop into the mould, partial return of the carriage in the forward direction until the mould is situated beneath the press, stoppage in this position to enable the press to mould the component to be made in the mould and to enable the temperature drop to take place, and finally complete return of the carriage in the forward direction after the press has cleared the mould, thus enabling the said heating table to be re-loaded and a new cycle of operations to be started.

One embodiment of a machine according to the invention intended for the manufacture of watch glasses is shown by way of example in the accompanying drawing wherein:

FIG. 2 is a plan view thereof, certain parts having been omitted or shown in section.

FIG. 3 is a partial elevation, some parts being shown in section, and,

FIGS. 4 and 5 are sectional views in partial section showing a detail of the machine on an enlarged scale in two different operating positions.

Figure 1:
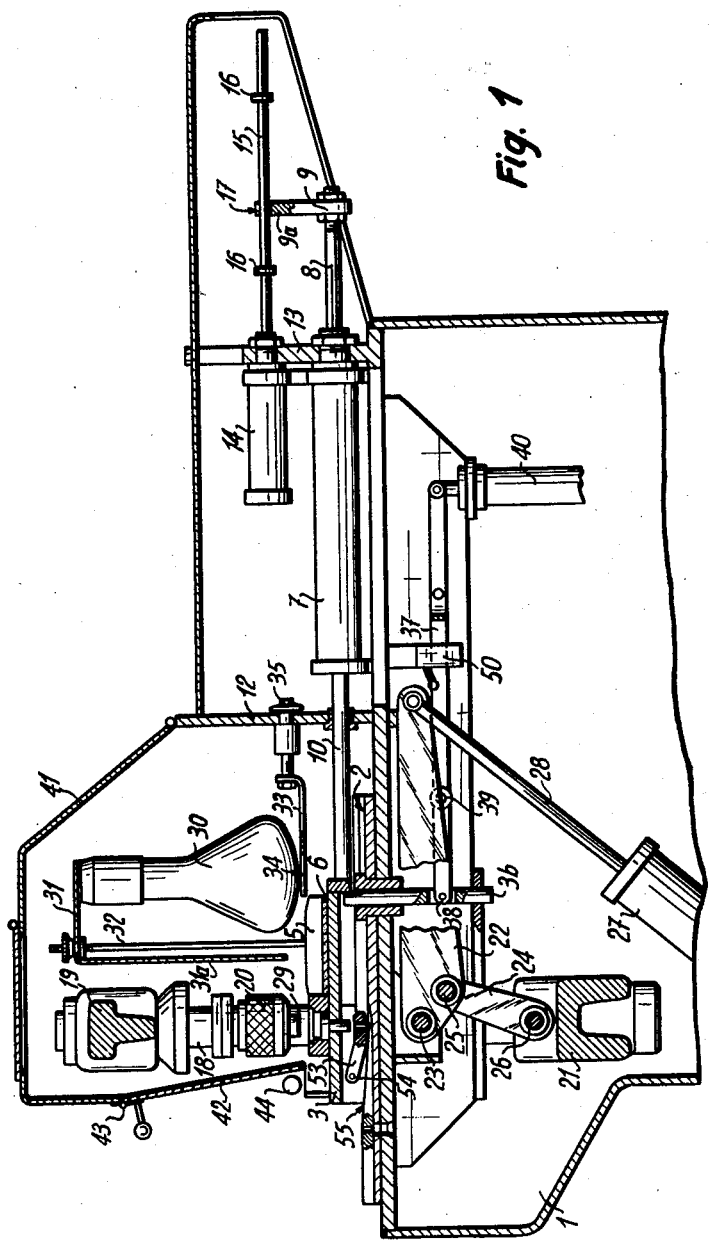
FIG. 1 is a sectional view of part of the said machine.

The machine illustrated comprises a frame 1 with a slide guide 2 which faces the operator and on which a carriage 3 moves. The latter carries a mould 4 and a from the carriage 3 by a sheet of asbestos 6. The surface from the carriage by a sheet of asbestos 6. The surface of the table 5 is situated level with the top surface of the mould 4. These two elements, the mould and the table, are situated one after the other with respect to the direction of movement of the carriage. The carriage movements are controlled pneumatically by means of a cylinder 7 which is disposed horizontally behind the carriage, and of which the piston (not shown in the drawing) is connected by a rod 8 to a cross-member 9 which is in turn connected by two rods 10 to a cross-member 11 connected to the carriage (FIGS. 1 and 2). These rods 10 are guided in fixed cross-members 12 and 13 of the machine frame.

At the two ends of its travel, the carriage 3 is braked by means of a hydraulic cylinder 14, the piston of which carries a rod 15 having two stops 16 between which an extension 9a of the cross-member 9 moves; said extension 9a has a slot 17 through which the rod 15 passes. At the two ends of the carriage travel, the extension 9a of the cross-member strikes against one or other of the stops 16 and then drives the rod 15 and its piston, thus braking the carriage.

The machine further comprises a press with two movable columns 18 connected by a top cross-member 19 carrying the ram 20, and a bottom cross-member 21 serving as power off-take for the press. The drive is of the toggle type: two levers 22 pivotally connected to the frame of the machine at 23 act upon the cross-member 21 by means of three connecting rods 24 which are pivotally connected at 25 to the said levers and at 26 to the cross-member. The levers 22 are in turn driven pneumatically by means of a cylinder 27 disposed obliquely in the frame of the machine (FIG. 1) and of which the piston (not shown) is connected to the levers by a rod 28. The press ram 20 carries a punch 29.

The machine comprises a heat source formed by an infra-red lamp 30 mounted on a support 31, of which a part 31a forms a heat-protection screen and which is in turn supported by two columns 32, only one of which is shown in the drawing, which are fixed on the frame of the machine.

The press and the lamp 30 are disposed one after the other on the axis of movement of the carriage 3.

A stationary stop 33 with a V-shaped slot 34 is disposed beneath the lamp 30 very slightly to the rear thereof. The position of this stop is adjustable by means of screws 35.

The machine further comprises a carriage locking device which acts in one of the positions of said carriage. Said locking device comprises two vertical bolts 36 (FIGS. 1 and 2) driven by a double lever 37 having the shape of a yoke. The ends of the arms of this yoke are each pivotally connected to one of the bolts 36, at 38, while these arms themselves are pivotally connected to the frame of the machine at 39. This double lever 37 is driven by a pneumatic cylinder 40.

A top cover 41 covers the whole of the machine elements except the front end of the slide guide 2. This cover is provided with a transparent plastic flap 42 pivotally connected at 43, this flap has to be lifted by hand to gain access to the heating table 5 when the carriage occupies its most forward position (FIG. 5) for the purpose of cleaning this table or the punch 29. A safety photoelectric cell 44 (FIG. 1) is illuminated by a source of light (not shown) when the operator's hand is not beneath the cover 41. In that case, the beam of light is interrupted and the cell 44 acts on the machine control system so as to prevent any operation of the machine, particularly any operation of the press.

Finally, the machine comprises various electrical switches 45, 46, 47 and 48, which are actuated by a projection 49 provided on one of the carriage drive rods 10 (FIG. 2), and a switch 50 controlled by one of the press drive levers 22 (FIG. 1); the purpose of these various switches will be explained hereinafter.

The machine described and illustrated operates in the following way:

The machine is first set to heating so that its various elements, particularly the mould 4 and the punch 29, assume the temperature at which moulding can be carried out satisfactorily.

The carriage 3 being brought into the most forward position, the table 5 is manually loaded with a blank formed by a disc or small plate of plastic material.

The main machine control knob is pressed, this knob being denoted by reference 52 in FIG. 3. It should be noted that if the carriage does not occupy its most forward position, in which the switch 45 is actuated by the projection 49 on the rod 10, operation of the control knob 52 remains ineffective, or else the carriage 3 begins to retract under the action of the control cylinder 7 until the projection 49 actuates the switch 47, thus stopping the travel of the carriage. Furthermore, the switch 47 trips an adjustable time switch which determines the period of stoppage of the carriage. In this position, corresponding to the position shown in FIG. 4, the blank is placed beneath the lamp 30 between the arms of the V-shaped slot 34 in the stop 33, which centres it with respect to the lamp.

When the heating time has elapsed, this time varying according to the dimensions of the blank used, the time switch re-starts the carriage and the latter continues to retract. The blank softened by heating remains between the arms of the stop 33 and slides on the table 5, which moves until the mould 4 occupies a position beneath the stop 33. The blank then drops into the mould 4. At the same time, the projection 49 closes the switch 48 which on the one hand controls the reversal of movement of the carriage and on the other hand the operation of the bolts 36. The latter come into the operative position and lock the carriage as soon as the cross-member 11 connected to the latter strikes against their top end.

In this position of the carriage, the mould is situated exactly beneath the press (FIG. 1). Also in this position, the projection 49 actuates the switch 46 which controls the press. The punch 29 descends into the mould and forms the watch glass. It stops in the mould for an adjustable time to enable the glass thus produced to cool for removal from the mould. The punch then ascends until one of the levers 22 at the end of the movement actuates the switch 50 which unlocks the bolts 36. The carriage control cylinder 7 has in the meantime remained under pressure so that the carriage continues its travel in the forward direction immediately it is unlocked. It then resumes its most forward position. During this travel, a lever 53 pivotally connected at 54 beneath the carriage bears on an inclined plane 55 formed on the slide guide 2 and pushes up the base 56 of the mould, which is movable, thus resulting in ejection of the glass denoted by reference 57 (FIG. 5) from the mould. The carriage is then in its most forward position in which the mould 4 can easily be cleaned and the table 5 reloaded for a new cycle of operations. It should be noted that in this position of the carriage an aperture 58 formed in the lever 53 registers with an aperture 59 in the frame 1 (FIG. 5), thus enabling a rod to be inserted for extraction of the base 56 of the mould.

The machine finally comprises a press-button 60 for putting the machine out of operation, and this press-button not only stops its operation but connects the various pneumatic control cylinders to atmosphere, in the event of abnormal working of the machine or a faulty operation.

It should be noted that the stationary stop 33 is adjustable and detachable and that it can be replaced by a stop having a different shape depending upon the shape of the blank used, which latter in turn depends on the shape of the watch glass to be made.

The machine control means have not been described and illustrated except to the extent necessary for an understanding of its operation, because they are outside the invention and will be familiar to those versed in the art.

As an alternative, the lamp 30 may be replaced by any other adequate heating means, for example an electrical heater, an infra-red heater, and so on.

What I claim is:

1. In a machine for making a component of thermoplastic material, more particularly a watch glass, a movable carriage, a mould and a heating table carried by the said carriage and situated one after the other with respect to the direction of movement of said carriage, the surface of the heating table being situated level with the top surface of the mould, a punch, a stationary press carrying the said punch, a stationary heat source, the said press and the said heat source being also situated one after the other on the movement axis of said carriage, and a stationary stop situated just above the said heating table whereby the latter passes beneath said stationary stop during part of the travel of the carriage.

2. In a machine for making a component of thermoplastic material, more particularly a watch glass, a movable carriage, a mould and a heating table carried by the said carriage, and situated one after the other with respect to the direction of movement of said carriage, the surface of the heating table being situated level with the top surface of the mould, a punch, a stationary press carrying the said punch, a stationary heat source, the said press and the said heat source being also situated one after the other on the movement axis of said carriage, and a stationary stop situated just above the said heating table whereby the latter passes beneath said stationary stop during part of the travel of the carriage, said stationary stop having a V-shaped slot into which the said blank partially penetrates, thus ensuring its centering beneath the heat source.

3. In a machine for making a component of thermoplastic material, more particularly a watch glass, a movable carriage, a mould and a heating table carried by the said carriage and situated one after the other with respect to the direction of movement of said carriage, the surface of the heating table being situated level with the top surface of the mould, a punch, a stationary press carrying the said punch, a stationary heat source, the said press and the said heat source being also situated one after the other on the movement axis of said carriage, a stationary stop support, and a stop adjustably mounted on the said support, said stop being situated just above the said heating table whereby the latter passes beneath said stop during part of the travel of the carriage.

4. In a machine for making a component of thermoplastic material, more particularly a watch glass, a movable carriage, a mould and a heating table carried by the said carriage and situated one after the other with respect to the direction of movement of said carriage, the surface of the heating table being situated level with the top surface of the mould, a punch, a stationary press carrying the said punch, a stationary heat source, the said press and the said heat source being also situated one after the other on the movement axis of said carriage, a stationary stop situated just above the said heating table whereby the latter passes beneath said stationary stop during part of the travel of the carriage, and a device for locking the carriage in the position in which the mould is situated beneath the press.

References Cited in the file of this patent

UNITED STATES PATENTS

| | | |
|---|---|---|
| 2,304,663 | Smith et al. | Dec. 8, 1942 |
| 2,332,674 | Smith | Oct. 26, 1943 |
| 2,521,387 | Maynard et al. | Sept. 5, 1950 |
| 2,570,309 | Black | Oct. 9, 1951 |
| 2,823,417 | Pasini et al. | Feb. 18, 1958 |

FOREIGN PATENTS

| | | |
|---|---|---|
| 610,962 | Great Britain | Oct. 22, 1948 |